June 17, 1941.  C. W. SINCLAIR  2,246,017
RIM
Filed Nov. 27, 1939

INVENTOR.
CHARLES W. SINCLAIR
BY
ATTORNEYS

Patented June 17, 1941

2,246,017

UNITED STATES PATENT OFFICE 2,246,017

RIM

Charles W. Sinclair, Detroit, Mich., assignor to Kelsey-Hayes Wheel Company, Detroit, Mich., a corporation of Delaware Application November 27, 1939, Serial No. 306,420

6 Claims. (Cl. 301—11)

The invention relates to tire carrying rims and refers more particularly to tire carrying rims of that type having a tire receiving element and a felloe element.

The invention has for an object to provide an improved construction of tire rim having a well in its tire receiving element and a felloe element for supporting the tire receiving element.

The invention has for another object to provide a rim which may be economically manufactured.

Figure 1:
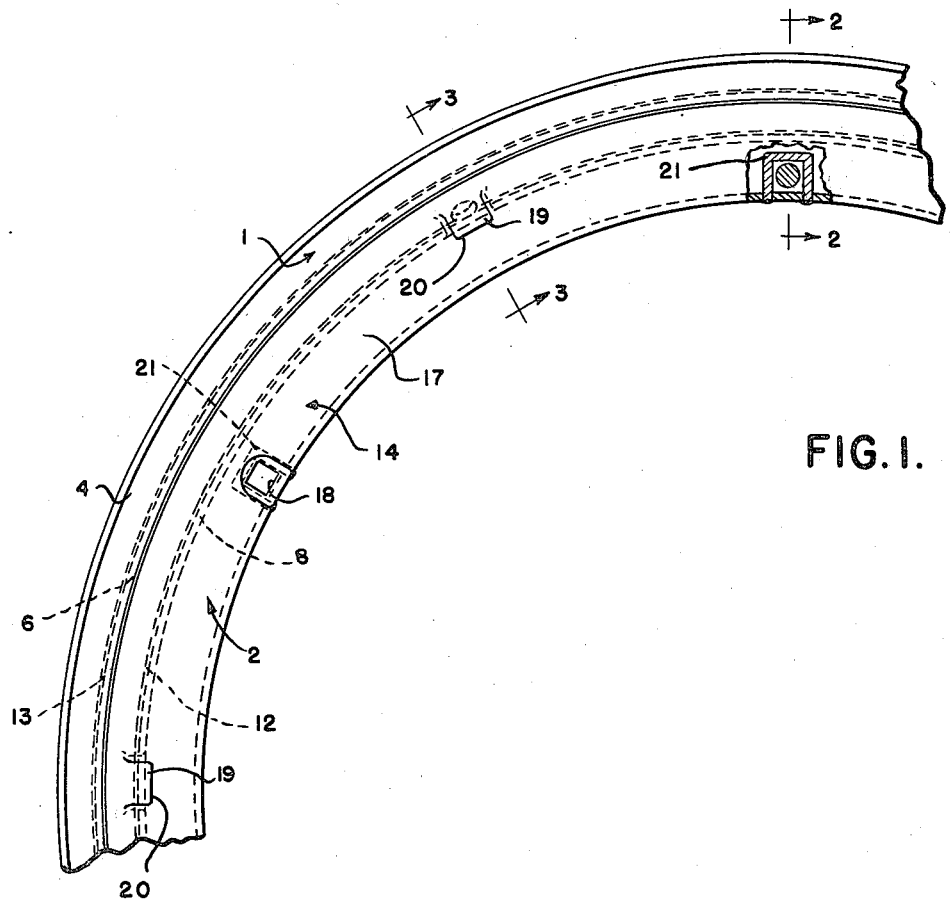
Figures 2, 3:
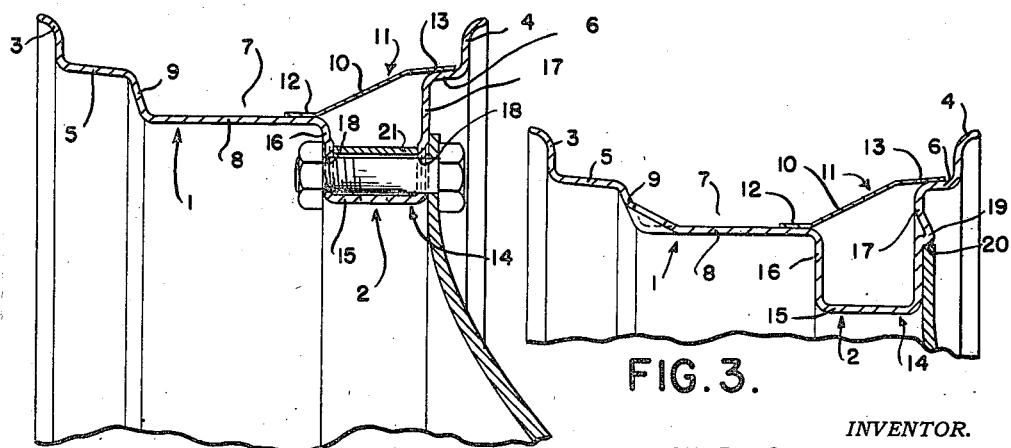

Other objects of the invention will become apparent from the following description, taken in connection with the accompanying drawing, in which Figure 1 is an elevation partly broken away of a rim embodying my invention;

Figures 2 and 3 are cross sections on the lines 2—2 and 3—3, respectively, of Figure 1.

The rim illustrated in the present instance is designed particularly for use with tractors and comprises the tire receiving element 1 and the felloe element 2. The tire receiving element is of the drop-center type and has the tire retaining flanges 3 and 4 at its edges, the lateral tire bead supporting portions 5 and 6, respectively, adjacent the flanges, and the central well 7. The well is formed on the base portion 8 of smaller radial dimension than the lateral portions 5 and 6, the generally radial portion 9 connecting into the lateral portion 5, and the flared portion 10 of the band 11. As shown, the flared portion 10 has a straight-line flare extending from the base portion at a smaller angle than the generally radial portion 9. The edge portions 12 and 13 of the band encircle and are fixedly secured, as by spot-welding, to the base portion 8 and the lateral portion 6, and the ends of the band preferably overlap. The edge portion 13 of the band preferably has the same axial and radial dimensions as the lateral portion 5, both of which serve as tire bead seats.

The felloe element 2 is formed by the annular channel 14 which has the base 15 of smaller radial dimension than the base portion 8. The channel also has the short and long sides 16 and 17, respectively, which connect into the base portion 8 and the lateral portion 6. With this arrangement the band 11, in addition to forming a portion of the well and a bead seat of the tire receiving element of the rim, closes the channel forming the felloe element and forms a tie between the outer edges of the sides of the channel. The sides of the well are formed with the registering holes 18 for receiving suitable means, such as bolts, for securing the rim upon a wheel body. The long side 17 is also formed with the projections 19 for centering the rim upon the wheel body when the long side lies adjacent the wheel body. It will be noted that these projections form at their radially inner ends the lateral shoulders 20 adapted to engage the periphery of the wheel body. To prevent crushing of the channel by the nuts threaded upon the securing bolts used in securing the rim to the wheel body, the spacers 21 are provided between and abutting the sides 16 and 17 of the channel. These spacers are preferably in the nature of sheet metal U-shaped members having their edges abutting the interior faces of the sides of the channel and the ends of their legs secured, as by being riveted, to the base 15. The spacers are secured in positions such that their legs and bases are adapted to extend around the bolts.

With this arrangement, it will be seen that if the rim is mounted on a disc wheel body, as partly illustrated in Figure 2, it may have four different mounting positions by locating either the short or long sides of the channel forming the felloe element against the disc and by reversing the rim. A still greater variation can be secured by reversing the disc wheel body which is dished.

With the above construction of rim, it will be noted that the rim is formed by the band 11 and an annulus of greater thickness having integral tire retaining flanges, lateral bead supporting portions, well base portion, and felloe forming channel. This annulus may be readily formed from a rectangular metal strip of the desired gauge by steps including die-pressing and the band may also be readily formed from a rectangular metal strip of less gauge by steps including die-pressing.

What I claim as my invention is:

1. A rim comprising an annular rim member having tire retaining flanges, lateral tire bead supporting portions connecting into said flanges, a generally radial portion connecting into one of said lateral portions, a base portion connecting into said generally radial portion, and an annular channel having its sides connecting into said base portion and the other of said lateral portions, and a band extending across said channel, said channel forming a felloe and said generally radial portion, base portion and band forming a well for the tire receiving element of the rim.

2. A rim comprising an annular rim member having lateral tire bead supporting portions, a generally radial portion connecting into one of said lateral portions, a base portion connecting into said generally radial portion, and a channel having its sides connecting into said base portion and the other of said lateral portions, means upon said lateral portions for retaining a tire, and a band extending across said channel and forming with said generally radial portion and base portion a well for the tire receiving element of the rim, said channel forming a felloe element for the rim.

3. A rim comprising a one-piece member having tire retaining flanges, lateral portions connecting into said flanges, one of said lateral portions forming a tire bead seat, a generally radial portion connecting into said bead seat forming portion, a base portion connecting into said generally radial portion, and an annular channel having its sides connecting into said base portion and the other of said lateral portions and a band extending across said channel and secured to said base portion and last mentioned lateral portion and forming a tire bead seat, said channel forming a felloe element and said generally radial portion, base portion and band forming a well for the tire receiving element of the rim.

4. A rim comprising a tire receiving element and a felloe element for supporting said tire receiving element, said felloe element being formed of an annular channel having a base and spaced sides extending from said base and connecting integrally into parts of said tire receiving element, and U-shaped spacers extending between said spaced sides and having their legs fixed to said base.

5. A rim comprising an annular rim member having tire retaining flanges, lateral tire bead supporting portions connecting into said flanges, a generally radially extending portion connecting into one of said lateral portions, a base portion connecting into said generally radial portion, and an annular channel having its sides connecting into said base portion and the other of said lateral portions.

6. A rim comprising an annular rim member having tire retaining flanges, lateral tire bead supporting portions connecting into said flanges, a generally radially extending portion connecting into one of said lateral portions, a base portion connecting into said generally radial portion, an annular channel having its sides connecting into said base portion and the other of said lateral portions, fastener elements extending through the sides of the channel, and spacers associated with the fastener elements and having the opposite ends respectively engaging the sides of the channel.

CHARLES W. SINCLAIR.